May 22, 1956 J. E. JACOBS 2,747,104

INTERVAL TIMING APPARATUS

Filed Oct. 6, 1951

INVENTOR:
JOHN E. JACOBS
BY:
Junius F. Cook, Jr.
ATTORNEY

United States Patent Office 2,747,104
Patented May 22, 1956

2,747,104

INTERVAL TIMING APPARATUS

John E. Jacobs, Milwaukee, Wis., assignor to General Electric Company, a corporation of New York Application October 6, 1951, Serial No. 250,141
18 Claims. (Cl. 250—95)

The present invention relates in general to interval timing, and has more particular reference to improved apparatus for timing ray exposure intervals, a specific aspect of the invention pertaining to apparatus especially well adapted for use in timing X-ray exposure intervals either in the making of ray pictures of objects under examination, or in the application of rays to the bodies of patients for therapeutic purposes.

While the teachings of the present invention may be advantageously applied to the timing of X-ray exposure intervals, it will be apparent that the same is not necessarily limited to use in connection with X-rays, but may have application to the exposure interval timing of other kinds of rays. In this connection, light, broadly speaking, comprises energy emanations or rays of vibratory character having wave lengths within the range of the spectrum, and including visible light rays, as well as rays of invisible character, such as ultraviolet and infrared rays, X-rays, gamma rays, electromagnet rays, and other rays of vibratory character, including rays comprising alpha and beta particles and electrons. These various ray categories, within the total light spectrum, are ordinarily identified by the characteristic vibratory frequency or wave length range thereof.

An important object of the present invention is to provide means for timing ray exposure intervals in terms of the total ray quanta dispersed from the ray source, or applied to an exposure subject, during the timed interval; a further object being to provide exposure timing equipment embodying a photosensitive element and associated equipment operable in conjunction with a ray source for discontinuing the application of rays from the source, upon an exposure subject, after the expiration of an interval of such duration that the sensitive element will be exposed to a predetermined quanta of rays from the source; a further object being to provide an integrating apparatus which will determine an exposure interval in terms of total light quanta applied to a sensitive element, during the exposure interval, rather than in terms of the elapsed time of exposure.

Another important object is to provide an exposure interval of the character mentioned and incorporating a photoresponsive element that is highly sensitive to X-rays; a further object being to utilize a semi-conductor having amplifying characteristics and, hence, significantly sensitive to X-rays for interval timing purposes.

Another object is to employ cadmium or mercury sulphide crystals, or the crystals of cadmium selenide, for photo-timing purposes, the same being not only usefully sensitive to X-rays, but also to other rays, including light rays having wave lengths within the visible light spectrum.

Another important object is to provide an X-ray exposure interval timer embodying a sensitive element disposed in the path of X-rays to be timed and connected for the activation of electronic integrating equipment, whereby the interval of X-ray application may be determined in terms of the quanta of the applied rays.

The foregoing and numerous other objects, advantages and inherent functions of the invention will become apparent as the same is more fully understood from the following description, which, taken in conjunction with the accompanying drawings, discloses preferred embodiments of the invention.

Referring to the drawings.

Figures 1, 2, 3, 4, 5, 6:
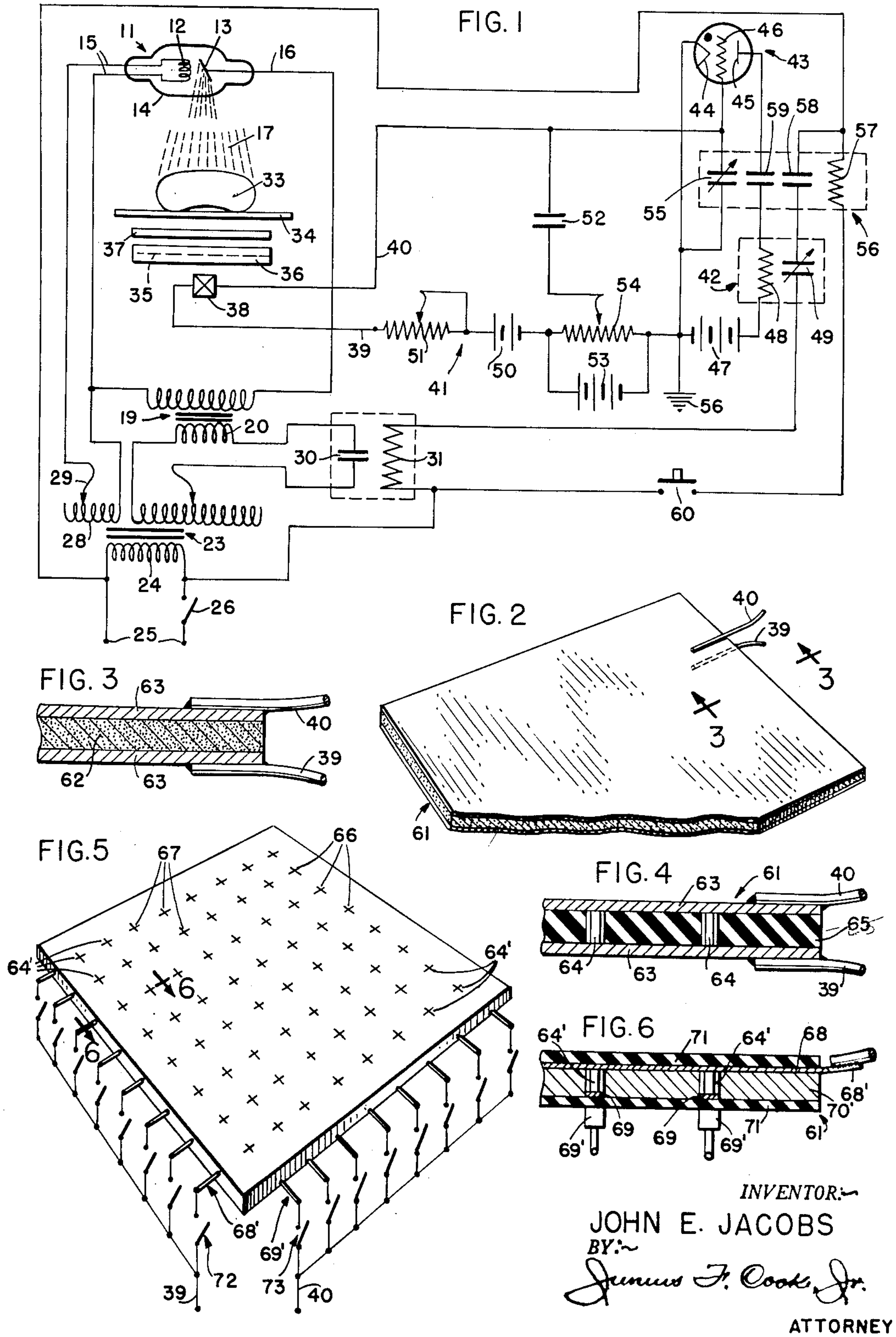
Fig. 1 is a diagrammatic illustration of timing apparatus embodying the present invention.
Figs. 2 and 5 are perspective views of screens which may be employed with the equipment shown in Fig. 1.

Figs. 3 and 6 are sectional views respectively taken substantially along the line 3—3 in Fig. 2, and on line 6—6 in Fig. 5, to show types of screen structures embodying the invention; and Fig. 4 is a sectional view like Fig. 3 illustrating another type of screen embodying the invention.

To illustrate the invention, the drawings show a controllable source of X-rays comprising a conventional X-ray generating tube 11 having an electron emitting cathode 12, and an anode 13 forming an electron target disposed in position to receive the impact of electrons emitted at the cathode. The anode and cathode are mounted in spaced facing relationship within a sealed and evacuated envelope 14. As shown, the cathode 12 comprises an electron emitting filament connected with conductors 15 which extend outwardly of the envelope 14, through suitable seals, for the purpose of applying cathode energizing power, from a suitable external power source, to excite the filament for electron emission. The anode 13 is also connected, through suitable envelope seal means, with suitable conductor means 16, outwardly of the envelope.

It should be understood that X-rays are generated, in such a tube 11, as the result of impingement, on the anode 13, of electrons emitted by the cathode and caused to travel thence, at high speed toward the anode, under the influence of electron driving potential applied between the anode and cathode. The tube 11 may thus be caused to operate for the generation of X-rays, by energizing the cathode for electron emission, as by connecting the conductors 15 with a suitable source of cathode energizing power, while simultaneously applying an electron driving potential between the cathode and the anode, as by connecting one of the conductors 15 and the conductor 16 with a suitable source of electron driving potential outwardly of the envelope. Electrons emitted by the filament 13 may travel, from the filament, as an electron beam under the influence of the anode-cathode electron driving potential and impinge upon the facing target surface of the anode 13, thereby constituting the target surface as an X-ray source from which the generated X-rays may be emitted outwardly of the envelope in the form of an X-ray beam 17.

To thus operate the tube as an X-ray generator, the anode conductor 16 and one of the cathode conductors 15 may be connected with the secondary winding 18 of a step-up transformer 19, in order to constitute said secondary winding 18 as the immediate source of electron driving potential for application between the cathode and anode of the generator tube 11. To energize the transformer 19, its primary winding 20 may be connected with the secondary winding 21 of a step-up transformer 23, the primary winding 24 of which is connected with a suitable power source 25, preferably through a disconnecting switch 26. Means, such as an adjustable connection 27 with the winding 21, may be and preferably is provided for varying the potential applied between the anode and cathode. To energize the cathode 12 for electron emission, the conductors 15 may be connected with a secondary winding 28 of the transformer 23, preferably through an adjustable connection 29.

In order to start and stop the generation of X-rays, a control switch 30 may be interposed at any convenient location in the anode-cathode power supply circuit of the generator, the switch 30, as shown, being preferably connected in the power supply circuit to the primary winding of the transformer 19. The switch 30 preferably comprises a normally open relay switch adapted to be closed, by an associated coil or solenoid 31, when and so long as said coil is energized, as from the source 25.

The X-ray beam 17 may be applied to any useful purpose, including the therapeutic irradiation of the body 33 of a patient, which may be supported for treatment in the path of the beam 17, as on a treatment table 34. The beam 17 may also be usefully employed for the production of X-ray shadow pictures of the body 33, or other object to be pictured, by mounting a sheet of X-ray sensitive film material 35, preferably enclosed in a suitable light-tight cassette 36, in the path of the beam 17 and on the side of the body 33 remote from the X-ray source, so that the film 35 will be exposed to the action of the beam after it shall have passed through the body 33 to thus impose on the film an X-ray shadow picture of the body in accordance with known X-ray photography procedures, including the arrangement of a Bucky diaphragm 37 between the body being pictured and the cassette enclosed film.

In thus applying X-rays to the bodies of patients for either therapeutic or radiographic purposes, it is highly desirable to determine accurately the total amount or quanta of X-rays applied to the body during the exposure interval. Such accuracy is desirable for radiographic purposes in order to obtain optimum film density. Exposure quanta during X-ray therapy is likewise of importance, especially where the desired exposure is near the safe limit for the subject involved.

In the interests of accuracy, both film exposure for optimum density and safe therapy exposure limits ought to be measured in terms of X-ray quanta applied during the exposure interval. Heretofore, however, it has been necessary to determine exposure intervals by accurately adjusting the electron driving potential and cathode energizing power, applied to the X-ray generating tube, in order to produce an X-ray beam of desired intensity, and then applying the beam during a predetermined elapsed time interval to thus expose the body being treated or pictured to a desired X-ray quanta. This may be accomplished by energizing the solenoid 31 during a selected time interval under the control of special and expensive mechanical timing equipment, to thereby close the switch 30 during the selected interval and open the same, or another switch in series therewith, at the expiration of the selected interval.

It will be seen, however, that the desired exposure, measured in terms of quanta, will be attained only if, during the exposure period, the selected electron driving potential, as well as the selected cathode excitation, are accurately maintained. Any variation in either cathode excitation or electron driving potential will alter the X-ray quanta delivered during the time exposure interval. Where the exposure is thus determined in terms of time and X-ray tube loadings, it is essential not only to provide for maintaining absolutely constant the voltage and current available at the source 25, but it is also necessary to assure the accurate adjustment of the voltage selectors 27 and 29. These must be set, not only in accordance with the selected exposure time interval, but also must be adjusted more or less empirically, as from auxiliary technique charts, depending upon the size, weight, thickness and constituent material of the body 33. The necessary adjustment of the voltage selecting means 27 and 29 is, of course, determined to some extent by the judgment of the roentgenologist in charge of the operation of the machine, so that such adjustments are subject to the element of human error. Furthermore, considerable difficulty is encountered, especially where fractional second interval timing is necessary, in providing reliable mechanical timing apparatus for the control of the relay switch 30. Some of such difficulties are explained in United States Patent No. 2,325,860, issued August 3, 1943, on the invention of Arthur J. Kizaur, which patent discloses one of the most satisfactory mechanical timing devices heretofore provided.

In order to avoid the inherent disabilities in the mechanical timing of X-ray exposure intervals, the present invention contemplates equipment responsive directly to X-ray exposure quanta for delimiting X-ray exposure intervals. To this end, a sensitive element 38 is disposed in any convenient location in the path of the X-ray beam 17. Although the element 38 is shown mounted in position on the side of the body 33 remote from the X-ray source, so that rays, in reaching the element 38, must first pass through the body 33 as well as the diaphragm 37 and the cassette enclosed film 35, it is entirely possible to dispose the element 38 in the direct rays of the beam 17, as at one side of the body. It is, however, more expedient to mount the element 38 in the space readily available behind the film cassette, in the body-supporting table structure.

The sensitive element 38 preferably comprises a crystal or crystals of a suitable X-ray sensitive semi-conductor material, such as cadmium or mercury sulphide, or cadmium selenide. For the purpose of explaining the present invention, a semi-conductor may be defined as a substance having electrical resistance, or reactance, or both, which vary in accordance with the intensity of rays to which the substance is exposed, the combined electrical resistance and reactance of a conductor being commonly referred to as the impedance thereof. Cadmium and mercury sulphide, and cadmium selenide, in this respect, have been found to be semi-conductors usefully sensitive to X-rays, the same in the absence of X-rays having impedance characteristics of such high order as to constitute them as virtual insulators capable of substantially preventing the flow of electrical energy therethrough. The electrical characteristics of the named materials are such that the impedance thereof progressively declines or becomes reduced in proportion to the intensity of X-rays impinging thereon and, as more fully explained in the co-pending applications, Serial No. 190,801, filed October 18, 1950, now Patent No. 2,706,790, and Serial No. 232,073, filed June 18, 1951, now Patent No. 2,706,791, the intensity of impinging X-rays may be accurately measured in terms of the apparent impedance of the sensitive semi-conductor element 16.

These named semi-conductors may also be distinguished from commonly known semi-conductors in that they exhibit current amplifying characteristics. Semi-conductors operate as such through the release of electrons, entrapped therein, when subjected to energy rays to which they are sensitive. Commonly known semi-conductors, such as selenium, none of which are to any appreciable or useful extent sensitive to X-rays, operate to release electrons in direct proportion to changes in the electrical space charge of the material, as the result of ray impingement thereon, and thus do not show current amplifying characteristics. The sulphides of cadmium and mercury, however, as well as the selenide of cadmium, appear to release many thousands or hundreds of thousands of electrons in response to unit alteration of the space charge therein, when excited by rays, including X-rays, to which said materials are sensitive. The sensitive element 38 thus, in effect, comprises a tiny electronic amplifier capable of delivering a substantial quantity of electrical current when excited by X-rays.

It is thought that the amplifying character of these crystal materials is due to the fact that they comprise what may be called excess electron or electron donor semi-conductors, the excess energy necessary to produce amplified currents in the crystals being derived from the electron producing character of the materials themselves, when irradiated or triggered, by exposure to X-rays. It is suggested that electron donor centers in each crystal become ionized by the impinging X-rays, thus forming stationary positive space charges in the material. The amplifying action of these electron donor materials can be compared to that of a conventional triode tube where the grid is assumed to be floating.

In such a tube, the grid takes up a negative charge as a result of electron flow therein, thus reducing the plate current to a small value. If the grid, however, be charged positively, the current will materially increase. In the electron donor type of crystal material, the conduction electrons are, to a large extent localized in traps, thus forming a current-reducing, stationary, negative space charge. When rays impinge upon the crystal, its electron donor centers become ionized, thus assuming positive charges. These stationary positive charges are thought to act in the crystal in the same way as do positive charges applied on the grid of a triode tube. One positive hole, or center, so established in the crystal, appears to control the flow of more than ten thousand electrons in the crystal. This is in contradistinction to the action of ordinary photosensitive semi-conductors, such as selenium, where this amplification mechanism is absent. As a consequence, electrical energy is released in the electron donor type of crystal material in the form of crystal current that is many times the energy applied to the crystal by the exciting ray, the action being such as to render these electron donor semi-conductors detectably sensitive to X-rays.

X-ray sensitive crystals of cadmium and mercury sulphide, and of cadmium selenide, may be grown in the form of hexagonal prisms, by vapor phase procedures, and such a crystal may be electrically connected at its opposite ends with suitable conductors 39 and 40, as by coating the opposite ends of the crystals each with a layer, film or plate of electrical conducting material with which the conductors 39 and 40 may be electrically joined; and the present invention utilizes the semi-conducting and amplifying characteristics of the element 38 to measure X-ray quanta applied on the crystal, and to operate mechanism for controlling the operation of the X-ray source 11 during intervals of time measured in terms of X-ray quanta applied on the crystal during the measured interval. In this connection, it will be apparent that the total flow of crystal current in the element 38, in response to the application of X-rays thereon, during any exposure interval, will be a function of X-ray quanta applied on the crystal during such interval. The present invention, accordingly, utilizes the so-developed current in the crystal 38 for the control of timing equipment operable to disable the X-ray source after the same shall have been in operation for a time interval exactly sufficient to apply a desired quanta of X-rays upon the irradiated object or body 33.

Any suitable or preferred means may be employed for controlling the X-ray source in accordance with the total current which flows through the crystal 38 during the exposure interval. As shown, the timing apparatus may comprise an electron translation system 41 adapted to actuate a suitable load device 42 for the control of the X-ray source 11 after the elapse of a selected time interval, following initiation of the source in useful operation, measured in terms of current delivered through the sensitive element 38, the same being proportional to the quanta of X-rays applied to the crystal 38 during the operation of the X-ray source as such. To these ends, the translation system 41 preferably embodies a thyratron tube 43, the same comprising a gas-filled electron flow device having a cathode 44, an anode 45, and a control grid element 46. The anode and cathode 45 and 44 may be interconnected in an output circuit including a suitable power source 47 and the load device 42 which, in the illustrated embodiment, comprises the operating coil 48 of a normally closed relay switch 49.

The control grid 46 of the thyratron may be interconnected in a control circuit in which the sensitive crystal element 38 is also operatively connected, and means is provided for electrically energizing the grid 46 for the control of the output circuit of the tube 43 in accordance with total current caused to flow in the element 38 during an X-ray exposure interval to be timed. The sensitive element 38 may be electrically connected with the grid 46 of the thyratron tube through the conductor 40. The grid control circuit may also include a preferably unidirectional power source 50, and an adjustable potentiometer 51 interconnected in series with the power source and with the sensitive element 38 through the conductor 39. The circuit includes a condenser 52 interconnected between the cathode and grid of the thyratron tube 43, as well as an adjustable source of grid biasing power for the tube 43, the same comprising a preferably uni-directional power source 53 and an adjustable potentiometer 54, said power source 53 being interconnected in parallel relationship with the potentiometer 54 between the cathode of the tube 43 and the power source 50, and the condenser 52 being interconnected between the grid 46 of the thyratron tube and the adjustable tap of the potentiometer 54. The circuit may also include a normally closed disabling switch 55, interconnected between the cathode and grid of the tube 43, and a normally open anode circuit switch 59, the cathode of said tube being preferably grounded, as at 56.

The thyratron tube 43 comprises a trigger device adapted to become conducting between the anode and cathode thereof for the operation of the load device 42 from the power source 47 whenever the voltage applied between the grid and cathode of the trigger device reaches a predetermined value. So long as the anode circuit switch 59 remains open, valve 43 will be inactive because its anode circuit will be incomplete. While the switch 55 contemporaneously remains closed, the condenser 52 will be charged negatively by the grid biasing means 53 and 54, to an extent determined by the setting of the potentiometer 54. Means is provided for opening the switch 55 and simultaneously closing switch 59 at the instant when the X-ray source 11 is placed in operation to apply the beam 17 to the body 33. When the switch 55 is thus opened, the negative potential of the charged condenser 52 is immediately applied between the cathode and grid of the tube 43, which continues to remain inactive, the same being biased to cut-off condition by the negatively charged condenser. Application of the X-ray beam 17 to the body 33, however, energizes the sensitive element 38 which operates, in conjunction with the power source 50 and potentiometer 51 to progressively reduce the negative charge of the condenser 52 at a rate proportional to the X-ray quanta applied on the element 38. Accordingly, after a predetermined quanta of X-rays has impinged upon the element 38, as determined by the settings of the potentiometers 51 and 54, the charge on the condenser 52 may become reduced to the value at which the tube 43 triggers and goes into operation as an electron conductor between the anode and cathode thereof. When the tube is thus "fired" or placed in operation, it energizes the coil 48 and causes the switch 49 to open. After being triggered, the tube 43 continues in operation until the switch 55 is reclosed and the switch 59 reopened. It should be noted that the potentiometers 51 and 54 thus serve as means for selectively adjusting the interval timer.

Any preferred means may be employed for utilizing the foregoing operation of the thyratron for the control of the X-ray source 11. As shown in the drawing, such control is accomplished by providing a relay 56 having an actuating coil 57, a normally open switch 58, the normally open switch 59, and the normally closed switch 55. By energizing the coil 57, the normally closed switch 55 will open and will remain in open condition until the coil 57 is de-energized; and the switches 58 and 59 will close and remain closed so long as the coil 57 is energized. The coil 57 may be connected with the power source 25 in series with and hence under the control of a normally open control switch 60. The normally open switch 58 of the relay 56 may also be connected with the normally closed relay switch 49 and the operating coil 31 of the normally open switch 30, to form a series circuit connected with the power source 25. The normally open switch 59 of the relay may be interconnected in series in the plate circuit of the thyratron tube.

In order to place the X-ray tube 11 in operation for the application of the X-ray beam 17 to the body 33, the switch 60 may be closed, as by the action of the roentgenologist in charge of the equipment, thereby energizing the relay coil 57 to open the switch 55 and close the switches 58 and 59. Thereafter, the X-ray generator will remain in operation until a predetermined X-ray exposure, measured in terms of quanta, shall have been applied to the body 33. Thereupon, the thyratron tube 43 will fire, energize the coil 48, and open the energizing circuit of the coil 31 at the switch 49. The coil 31, being thus de-energized, the switch 30 will open, thereby removing the electron driving potential from the anode and cathode of the X-ray tube, thus disabling the same as an X-ray source and discontinuing the application of the X-ray beam on the body 33.

The sensitive element 38 may comprise a single crystal of the selected sensitive material suitably mounted and supported in position to be irradiated by the X-ray beam 17; or a plurality of crystals, interconnected in parallel relation between the conductors 39 and 40, may be employed. Alternately, as shown more particularly in Figs. 2 and 3 of the drawings, a panel 61, comprising a multiplicity of crystals, may be employed in order that the X-ray sensitive element may extend over a substantial area within the X-ray beam, thereby affording an average determination of quanta over an extended area, rather than the quanta delivered within the limited area represented by a single crystal.

The screen 61 may comprise more or less finely ground or comminuted crystal material sintered, or otherwise bound together with suitable cement having electrical conducting properties, to form a layer 62 of sensitive crystal material. The opposite faces of the layer 62 may be provided with films 63 comprising layers of electrical conducting material applied in electrical contact with the faces of the layer 62. The films or layers 63 may comprise metal sheets, or films of electrical conducting plastic, and may be secured on and in electrical contact with the faces of the layer 62 in any preferred or convenient fashion. If of metal, the layers 63 may be applied as by condensing the metal from the vapor stage upon the opposite faces of the layer 62 in order to form the conducting films 63. If desired, the element 61 may be strengthened and rigidified by attaching it as on a supplementary supporting panel in any convenient fashion.

As illustrated in Fig. 4, the panel 61 may comprise individual crystals 64 of the selected photosensitive semi-conductor material. The crystals may be disposed in closely adjacent, side-by-side relationship, or in any desired spaced apart relationship, between the spaced panels 63. Where such crystals are in spaced relationship, the space intervening therebetween may be filled with any suitable non-conducting, preferably plastic, filler material 65, such as Bakelite, glyptal, silicone, or other convenient insulator material. The panel element 61, of course, may be interconnected in the control system 41 by electrically connecting the surface layers 63 thereof respectively with the conductors 39 and 40, as shown.

As shown more particularly in Figs. 5 and 6, the screen 61 may comprise a plurality of crystals 64 disposed in spaced relationship forming transverse rows 66 and longitudinal files 67 of crystals extending from side to side and from end to end of the screen. One end of each crystal, in a transverse row 66 of crystals, may be electrically connected with a common conductor strip 68, having an end 68′ projecting at an edge of the screen to form a connection tab, there being a separate conductor strip for each of the transverse rows 66 of crystals, each strip being connected only with the crystals of the corresponding crystal row. The ends of the crystals 64, remote from the ends which are connected with the strips 68, are electrically connected with longitudinally extending conductor strips 69, each strip 69 being so connected only with the crystals of the corresponding crystal file. The ends of the strips 69 may project at an edge of the screen 61 to form connection tabs 69′. The crystals 64 and the conductor strips 68 and 69 may be embedded in suitable non-conducting, preferably plastic, filler material 70, and suitable surface panels 71 of non-conducting material may be applied and secured in position covering the oppositely facing surfaces of the screen structure. As shown more especially in Fig. 5 of the drawings, the connection tabs 68′ and 69′, respectively, may be interconnected with the conductors 39 and 40, each through individual selector switches 72 and 73. The switches 72 thus comprise row controlling switches for interconnecting the crystals 64, in the system 41, in groups, by rows, while the switches 73 comprise file controlling switches for interconnecting the crystals 64, in the system 41, in groups, by files.

By closing a selected one of the row switches 72 and any selected one of the file switches 73, only that crystal in the connected row, which is also in the connected file, will be interconnected in the control system 41. By selectively controlling the switches 72 and 73, it will be seen that any selected one of the screen crystals 64′ may thus be interconnected in the circuit 41 in order to condition the equipment to operate in accordance with light ray quanta applied in that portion of the irradiated area containing the so selected crystal 64′. It will be seen also that a number of crystals, in any desired location within the irradiation area, may thus be selected and controllingly interconnected with the system 41 merely by closing appropriate switches of the switch groups 72 and 73. This facility is particularly useful in connection with the making of radiographic pictures with apparatus of the sort illustrated and described in United States Patent No. 2,327,603, issued August 24, 1943, on the invention of Arthur J. Kizaur, the same comprising apparatus for making ray pictures of localized areas within the total radiation field.

It will be seen from the foregoing that the present invention provides a relatively simple, inexpensive apparatus for determining X-ray exposure intervals and delimiting the same directly in accordance with X-ray quanta applied to an irradiation subject during the exposure interval. The present invention thus avoids all of the error promoting defects heretofore noted in connection with equipment heretofore provided for determining exposure intervals in terms of elapsed time, including possible error in the operation of the timing mechanism, errors of adjustment of the power supply to the X-ray source, as well as fluctuations in operating power, delivered to the X-ray generator, during the exposure interval. While equipment embodying the present invention has particular utility in connection with the timing of X-ray exposure intervals, the sensitive semi-conductor materials employed for detecting purposes are not only sensitive to X-rays, but to light rays, including visible light, having wave lengths in spectral zones other than the X-ray zone. For this reason, the principles of the present invention may be applied for the timing of exposure intervals during which rays, other than X-rays, but to which the named semi-conductor materials are sensitive, are employed as irradiating rays.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein being preferred embodiments for the purposes of illustrating the invention.

The invention is hereby claimed as follows:

1. Ray exposure interval timing apparatus comprising the combination, with means for the pulsating ray irradiation of an irradiation subject, including control means for the initiation and termination of the irradiation of the subject, of a ray sensitive semi-conductor element having current amplifying characteristics disposed in position to be impinged by irradiating rays during the exposure interval for measuring ray quanta thus impinging on the element in terms of the alternating current component of resulting current flow therethrough, a condenser and means to electrically charge the same to a selected level prior to the start of the irradiation interval to be timed, means for connecting said ray sensitive element with said condenser to discharge the same at a rate proportional to current flow in said element during an interval being timed, and means for operating said control means for the termination of irradiation when the charge on said condenser reaches a predetermined discharged value.

2. Ray exposure interval timing apparatus comprising the combination, with means for the pulsating ray irradiation of an irradiation subject, including control means for the initiation and termination of the irradiation of the subject, of a ray sensitive semi-conductor element comprising cadmium sulphide disposed in position to be impinged by irradiating rays during the exposure interval for measuring ray quanta thus impinging on the element in terms of the alternating current component of resulting current flow therethrough, a condenser and means to electrically charge the same to a selected level prior to the start of the irradiation interval to be timed, means for connecting said ray sensitive element with said condenser to discharge the same at a rate proportional to current flow in said element during an interval being timed, and means for operating said control means for the termination of irradiation when the charge on said condenser reaches a predetermined discharged value.

3. Ray exposure interval timing apparatus comprising the combination, with means for the pulsating ray irradiation of an irradiation subject, including control means for the initiation and termination of the irradiation of the subject, of a ray sensitive semi-conductor element comprising mercury sulphide disposed in position to be impinged by irradiating rays during the exposure interval for measuring ray quanta thus impinging on the element in terms of the alternating current component of resulting current flow therethrough, a condenser and means to electrically charge the same to a selected level prior to the start of the irradiation interval to be timed, means for connecting said ray sensitive element with said condenser to discharge the same at a rate proportional to current flow in said element during an interval being timed, and means for operating said control means for the termination of irradiation when the charge on said condenser reaches a predetermined discharged value.

4. Ray exposure interval timing apparatus comprising the combination, with means for the pulsating ray irradiation of an irradiation subject, including control means for the initiation and termination of the irradiation of the subject, of a ray sensitive semi-conductor element comprising cadmium solenide disposed in position to be impinged by irradiating rays during the exposure interval for measuring ray quanta thus impinging on the element in terms of the alternating current component of resulting current flow therethrough, a condenser and means to electrically charge the same to a selected level prior to the start of the irradiation interval to be timed, means for connecting said ray sensitive element with said condenser to discharge the same at a rate proportional to current flow in said element during an interval being timed, and means for operating said control means for the termination of irradiation when the charge on said condenser reaches a predetermined discharged value.

5. Ray exposure interval timing apparatus comprising the combination, with means for the pulsating ray irradiation of an irradiation subject, including control means for the initiation and termination of the irradiation of the subject, of ray sensitive semi-conductor means having current amplifying characteristics disposed in position to be impinged by irradiating rays during the exposure interval, integrating means comprising a condenser associated with said sensitive means, means to charge the condenser to a predetermined value prior to the initiation of irradiation whereby to allow for the progressive reduction of said charge, after initiation of irradiation, at a rate proportional to the alternating current component of electrical current flow induced in the sensitive means as the result of irradiation thereof, to thereby measure irradiation quanta in terms of reduction of the condenser charge, and means controlled by said condenser and operable to actuate said control means to terminate irradiation of the irradiation subject when the condenser charge reaches a predetermined value.

6. Ray exposure interval timing apparatus comprising the combination, with means for the pulsating ray irradiation of an irradiation subject, including control means for the initiation and termination of the irradiation of the subject, of ray sensitive semi-conductor means having current amplifying characteristics disposed in position to be impinged by irradiating rays during the exposure interval, integrating means comprising a condenser associated with said sensitive means, means to electrically charge the condenser to a predetermined negative value prior to the initiation of irradiation whereby to allow for the progressive reduction of said negative charge, after initiation of irradiation, at a rate proportional to the alternating current component of electrical current flow induced in the sensitive means as the result of irradiation thereof, to thereby measure irradiation quanta in terms of the decrease of said negative condenser charge, and a gas-filled electron flow device held normally inactive by said condenser charge at the initiation of irradiation, said electron flow device being adapted to become active upon predetermined reduction of said charge and being controllingly associated with said control means to terminate the irradiation of the subject upon activation of the flow device.

7. Ray exposure interval timing apparatus comprising the combination, with means for the ray irradiation of an irradiation subject, including control means for the initiation and termination of the irradiation of the subject, of ray sensitive means comprising crystalline electron donor semi-conductor material disposed in the path of the irradiating rays in position to be activated for self-amplified current flow therein during the exposure interval, integrating means operatively associated with said sensitive means for measuring ray quanta thus impinging thereon in terms of resulting current flow therethrough, and means controlled by said integrating means for operating said control means to terminate irradiation after predetermined current flow in said element, said ray sensitive means comprising a plurality of crystal elements disposed in the path of the irradiation rays and electrically interconnected in relatively parallel relationship and electrically connected with said integrating means.

8. Ray exposure interval timing apparatus comprising the combination, with means for the ray irradiation of an irradiation subject, including control means for the initiation and termination of the irradiation of the subject, of ray sensitive means comprising crystalline electron donor semi-conductor material disposed in the path of the irradiating rays in position to be activated for self-amplified current flow therein during the exposure interval, integrating means operatively associated with said sensitive means for measuring ray quanta thus impinging thereon in terms of resulting current flow therethrough, and means controlled by said integrating means for operating said control means to terminate irradiation after predetermined current flow in said element, said sensitive means comprising a plate-like element embodying spaced apart sheets or films of electrical conducting material with the ray sensitive material disposed intermediate and in electrical contact with said spaced sheets, said sheets being electrically connected with said integrating means.

9. Ray exposure interval timing apparatus comprising the combination, with means for the ray irradiation of an irradiation subject, including control means for the initiation and termination of the irradiation of the subject, of ray sensitive means comprising crystalline electron donor semi-conductor material disposed in the path of the irradiating rays in position to be activated for self-amplified current flow therein during the exposure interval, integrating means operatively associated with said sensitive means for measuring ray quanta thus impinging thereon in terms of resulting current flow therethrough, and means controlled by said integrating means for operating said control means to terminate irradiation after predetermined current flow in said element, said ray sensitive means comprising a plate-like element embodying spaced apart sheets or films of electrical conducting material with the ray sensitive material in finely divided granular condition forming a layer disposed intermediate and in electrical contact with said spaced sheets, said sheets being electrically connected with said integrating means.

10. Ray exposure interval timing apparatus comprising the combination, with means for the ray irradiation of an irradiation subject, including control means for the initiation and termination of the irradiation of the subject, of ray sensitive means comprising crystalline electron donor semi-conductor material disposed in the path of the irradiating rays in position to be activated for self-amplified current flow therein during the exposure interval, integrating means operatively associated with said sensitive means for measuring ray quanta thus impinging thereon in terms of resulting current flow therethrough, and means controlled by said integrating means for operating said control means to terminate irradiation after predetermined current flow in said element, said ray sensitive means comprising a plurality of crystals in spaced relation transversely of the path of said rays, and selectively operable means for electrically connecting said crystals with said integrating means.

11. A ray detecting screen comprising facing layers of electrical conducting material, at least one of said layers being pervious to the rays to be detected, and ray sensitive means comprising crystalline electron donor-semi-conductor material in finely granulated condition interposed as a layer of substantially uniform thickness between and in electrical contact with said facing layers.

12. A ray detecting screen embodying a plurality of elements comprising ray sensitive crystalline electron donor semi-conductor material, means to support said elements in spaced apart relation in the screen, and means for electrically connecting said elements in an external electrical translation system.

13. A ray detecting screen embodying a plurality of elements comprising ray sensitive crystalline electron donor semi-conductor material, means to support said elements in the screen in spaced relation providing transverse rows and longitudinal files or columns of said elements, transverse bus conductors each connected only with the elements of a corresponding row, and longitudinal bus conductors each connected only with the elements of a corresponding file, whereby to permit any one or more of said elements to be selected for electrical connection in an external electrical translation system.

14. Ray exposure interval timing apparatus comprising the combination, with means for the ray irradiation of an irradiation subject, including control means for the initiation and termination of the irradiation of the subject, of ray sensitive means comprising crystalline electron donor semi-conductor material disposed in the path of the irradiating rays in position to be activated for self-amplified current flow therein during the exposure interval, integrating means operatively associated with said sensitive means for measuring ray quanta thus impinging thereon in terms of resulting current flow therethrough, and means controlled by said integrating means for operating said control means to terminate irradiation after predetermined current flow in said element, said ray sensitive means comprising a ray detecting screen embodying a plurality of elements comprising ray sensitive crystalline electron donor semi-conductor material, means to support said elements in the screen in spaced relation providing transverse rows and longitudinal files or columns of said elements, transverse bus conductors each connected only with the elements of a corresponding row, and longitudinal bus conductors each connected only with the elements of a corresponding file, whereby to permit any one or more of said elements to be selected for electrical connection in an external electrical translation system.

15. Ray exposure interval timing apparatus comprising the combination, with means for the ray irradiation of an irradiation subject, including control means for the initiation and termination of the irradiation of the subject, of ray sensitive means comprising crystalline electron donor semi-conductor material disposed in the path of the irradiating rays in position to be activated for self-amplified current flow therein during the exposure interval, integrating means operatively associated with said sensitive means for measuring ray quanta thus impinging thereon in terms of resulting current flow therethrough, and means controlled by said integrating means for operating said control means to terminate irradiation after predetermined current flow in said element, said ray sensitive means comprising a ray detecting screen embodying a plurality of elements comprising ray sensitive crystalline electron donor semi-conductor material, means to support said elements in spaced apart relation in the screen, and means for electrically connecting said elements in an external electrical translation system.

16. Ray exposure interval timing apparatus comprising the combination, with means for the ray irradiation of an irradiation subject, including control means for the initiation and termination of the irradiation of the subject, of ray sensitive means comprising crystalline electron donor semi-conductor material disposed in the path of the irradiating rays in position to be activated for self-amplified current flow therein during the exposure interval, integrating means operatively associated with said sensitive means for measuring ray quanta thus impinging thereon in terms of resulting current flow therethrough, and means controlled by said integrating means for operating said control means to terminate irradiation after predetermined current flow in said element, said ray sensitive means comprising a ray detecting screen embodying facing layers of electrical conducting material, at least one of said layers being pervious to the rays to be detected, and ray sensitive means comprising crystalline electron donor semi-conductor material in finely granulated condition interposed as a layer of substantially uniform thickness between and in electrical contact with said facing layers.

17. Apparatus for timing pulsating X-ray exposures comprising the combination, with an operable source of X-rays, including control means for initiating and terminating the exposure of an irradiation subject to rays from said source, of X-ray sensitive means comprising crystalline electron donor semi-conductor material, said sensitive means being disposed in position to be impinged by X-rays emanating from said source during an exposure interval, whereby to measure the X-ray quanta impinging on said sensitive means in terms of the alternating current component of current flow therethrough, during an irradiation interval, integrating means comprising a condenser associated with said sensitive means, means to electrically charge the condenser to a predetermined negative value prior to the initiation of irradiation whereby to allow for the progressive reduction of said negative charge, after initiation of irradiation, at a rate proportional to current flow induced in the sensitive means as the result of irradiation thereof, to thereby measure irradiation quanta in terms of the decrease of said negative condenser charge, and a gas-filled electron flow device held normally inactive by said condenser charge at the initiation of irradiation, said electron flow device being adapted to become active upon predetermined reduction of said charge and being controllingly associated with said control means to terminate the irradiation of the subject upon activation of the flow device.

18. The method of timing pulsating X-ray exposure intervals which consists in measuring the quanta of irradiation applied during an exposure interval by inducing proportional current flow in a ray sensitive electron donor semi-conductor during the irradiation interval, applying only the alternating current component of said current flow to an integrating condenser, previously charged to a predetermined level, to progressively reduce the charged condition of the condenser whereby to determine total ray quanta in terms of the residual charge of the condenser, and terminating the irradiation interval when said condenser charge reaches a selected low value.

References Cited in the file of this patent

UNITED STATES PATENTS

| | | |
|---|---|---|
| 2,401,289 | Morgan et al. | May 28, 1946 |
| 2,488,315 | Morgan et al. | Nov. 15, 1949 |
| 2,543,039 | McKay | Feb. 27, 1951 |

OTHER REFERENCES

An Economical Industrial X-ray Detector, by R. Frerichs et al., General Electric Review, August 1951, pages 42, 43, 44 and 45.